United States Patent
Chang (10) Patent No.: US 8,320,694 B2
(45) Date of Patent: Nov. 27, 2012

(54) SURROUND ERROR DIFFUSION

(75) Inventor: Ching-Wei Chang, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 640 days.

(21) Appl. No.: 12/412,632

(22) Filed: Mar. 27, 2009

(65) Prior Publication Data
US 2010/0246987 A1 Sep. 30, 2010

(51) Int. Cl.
G06K 9/36 (2006.01)
G06K 9/38 (2006.01)
G06K 9/46 (2006.01)
H04N 1/405 (2006.01)

(52) U.S. Cl. ...................... 382/252; 358/3.03

(58) Field of Classification Search ................. None
See application file for complete search history.

(56) References Cited

U.S. PATENT DOCUMENTS

| | | | |
|---|---|---|---|
| 5,493,416 A | 2/1996 | Fan | |
| 5,604,605 A * | 2/1997 | Moolenaar | 358/3.03 |
| 5,692,109 A | 11/1997 | Shu | |
| 5,739,917 A | 4/1998 | Shu et al. | |
| 5,809,177 A | 9/1998 | Metcalfe et al. | |
| 6,026,199 A * | 2/2000 | Sommer | 382/252 |
| 6,072,591 A | 6/2000 | Harrington | |
| 6,271,936 B1 | 8/2001 | Yu et al. | |
| 6,552,824 B2 | 4/2003 | Rombola et al. | |
| 6,594,035 B1 | 7/2003 | Kresch et al. | |
| 6,671,071 B1 | 12/2003 | Kletter | |
| 7,031,514 B1 | 4/2006 | Shindo | |
| 7,265,872 B2 | 9/2007 | Tresser | |
| 7,379,211 B2 | 5/2008 | Ishii et al. | |
| 7,502,140 B2 | 3/2009 | Yamamura | |
| 7,701,614 B2 | 4/2010 | Yamazaki | |
| 7,961,962 B2 | 6/2011 | Cittadini et al. | |
| 8,009,327 B2 | 8/2011 | Ishikawa | |
| 2005/0025374 A1* | 2/2005 | Ishikawa | 382/252 |
| 2005/0088700 A1 | 4/2005 | Aoki et al. | |
| 2005/0094211 A1* | 5/2005 | Dang | 358/3.03 |
| 2005/0122545 A1* | 6/2005 | Ranganathan et al. | 358/3.03 |
| 2005/0259884 A1 | 11/2005 | Murakami et al. | |
| 2008/0079959 A1* | 4/2008 | Yamazaki | 358/1.8 |
| 2009/0244632 A1 | 10/2009 | Yoshimura | |

FOREIGN PATENT DOCUMENTS

| | | |
|---|---|---|
| EP | 1 107 576 A2 | 6/2001 |
| EP | 1 553 754 A1 | 7/2005 |

OTHER PUBLICATIONS

Nonfinal Office Action for U.S. Appl. No. 12/412,648 mailed Apr. 4, 2012.
Notice of Allowance for U.S. Appl. No. 12/412,648 mailed May 11, 2012.

* cited by examiner

*Primary Examiner* — Li Liu
(74) *Attorney, Agent, or Firm* — Michael Blaine Brooks, PC; Pejman Yedidsion; David Ripma (57) ABSTRACT

Machine-enabled methods of, and system, and processor readable media, embodiments for, tone quantization error diffusion, comprising a first stage process and a second stage process, where the quantization and error diffusion steps may be completed for lines scanned according to the first stage, and the quantized pixels may be tested to determine the actual output halftone pattern of the pixels. The quantized pixels may be tested to determine their actual output halftone pattern and threshold levels may be determined by measuring dot intensities for the output device, e.g., a multi-functional peripheral device.

11 Claims, 9 Drawing Sheets

SURROUND ERROR DIFFUSION

A portion of the disclosure of this patent document contains material which is subject to (copyright or mask work) protection. The (copyright or mask work) owner has no objection to the facsimile reproduction by any-one of the patent document or the patent disclosure, as it appears in the Patent and Trademark Office patent file or records, but otherwise reserves all (copyright or mask work) rights whatsoever.

CROSS-REFERENCE TO RELATED APPLICATIONS

This application is related to U.S. Patent Publication No. U.S. 2010-0245924 A1, titled "Multi-Level Surround Error Diffusion," by Ching-Wei Chang, filed Mar. 27, 2009, which is hereby incorporated herein by reference in its entirety for all purposes.

FIELD OF ENDEAVOR

The present invention, in its several embodiments, relates to methods, systems and processor readable media for tone quantization error diffusion.

BACKGROUND

Figure 1:
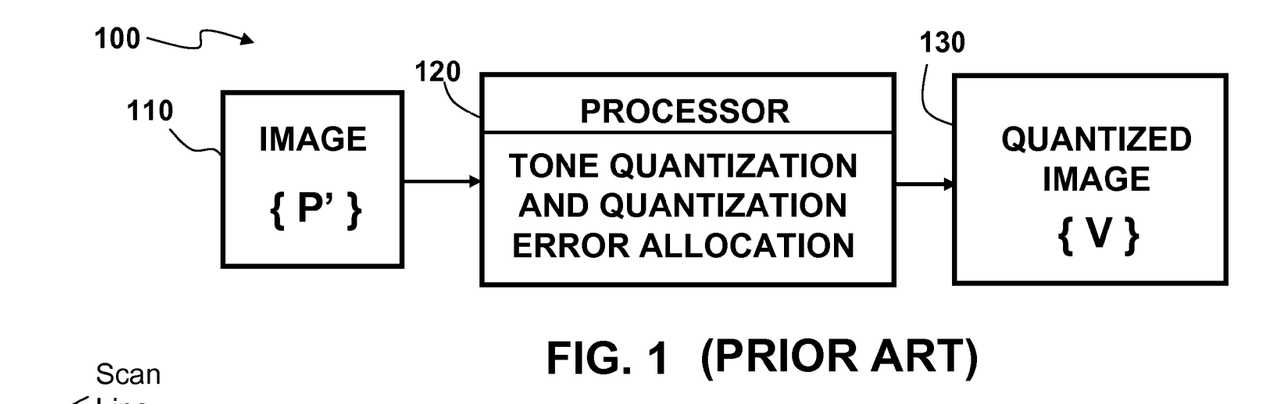
FIG. 1 is a top-level image tone quantization process functional block diagram.
Figure 2A:
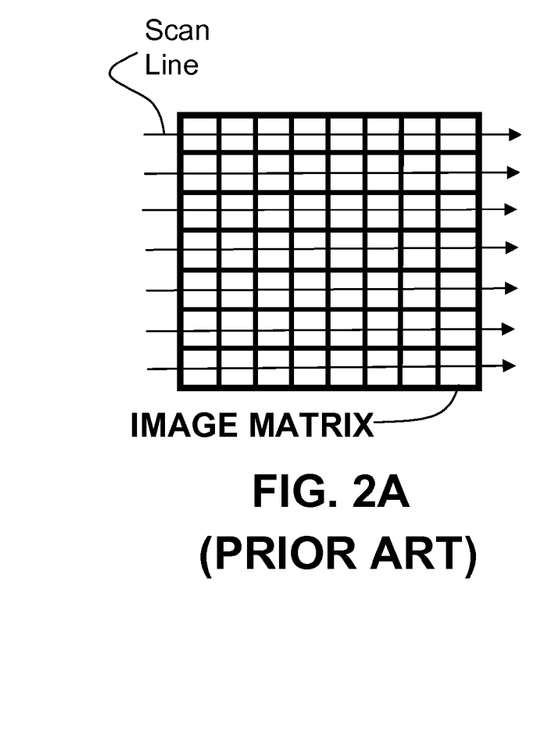
FIGS. 2A, 2B, and 2C illustrate exemplary scan patterns.
Figure 2B:
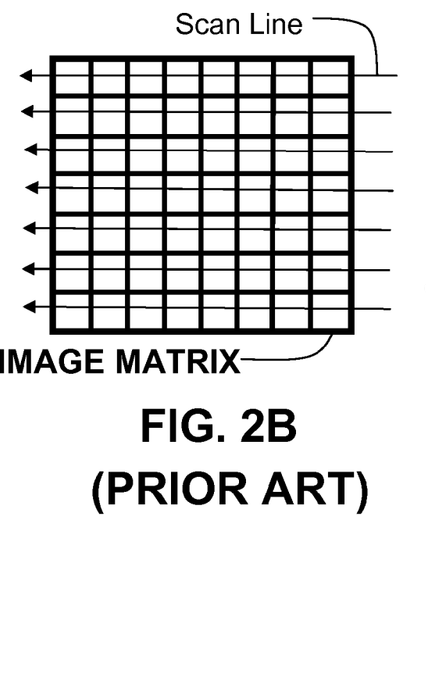
Figure 2C:
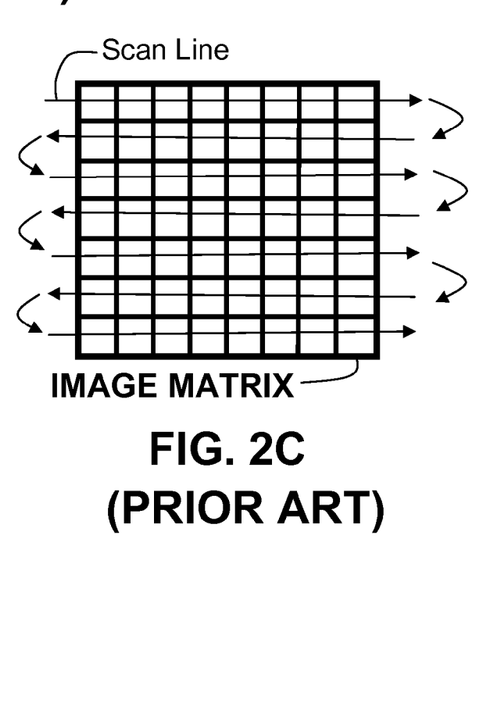

A conversion of an image format may result in a restriction in the gradation of expressions of grayscale and/or color component intensity. FIG. 1 is a top-level block diagram of a process 100 where a digital image 110 comprised of pixels having tone levels, $\{P'\}$, is provided to a processor 120 configured to execute instructions that quantizes the intensity level of each pixel of the digital image, resulting in the possibility of a tone error, i.e., the difference between the provided pixel tone intensity and the quantized tone intensity, for each quantized pixel. In addition to the tone quantization, the processor may allocate the resulting quantized tone error to the tone level of image pixels not yet quantized. The result is a quantized digital image 130 having tone values, $\{V\}$, that are affected by the input tone levels, the quantization levels and logic, and the allocation of tone error. The tone levels of pixels of a digital image may be expressed in a matrix of rows and columns. A scan line may be defined as a row or column of pixels scanned serially for tone quantization. When a horizontal scanning direction is employed, the horizontal scanning direction may be from right-to-left, right-to-left, or alternate the scanning direction between lines. FIG. 2A illustrates an example of right-to-left scanning of a digital image. FIG. 2B illustrates an example of left-to-right scanning of a digital image. FIG. 2C illustrates an example of alternating right-to-left and left-to-right scanning of a digital image.

Figures 3, 4:
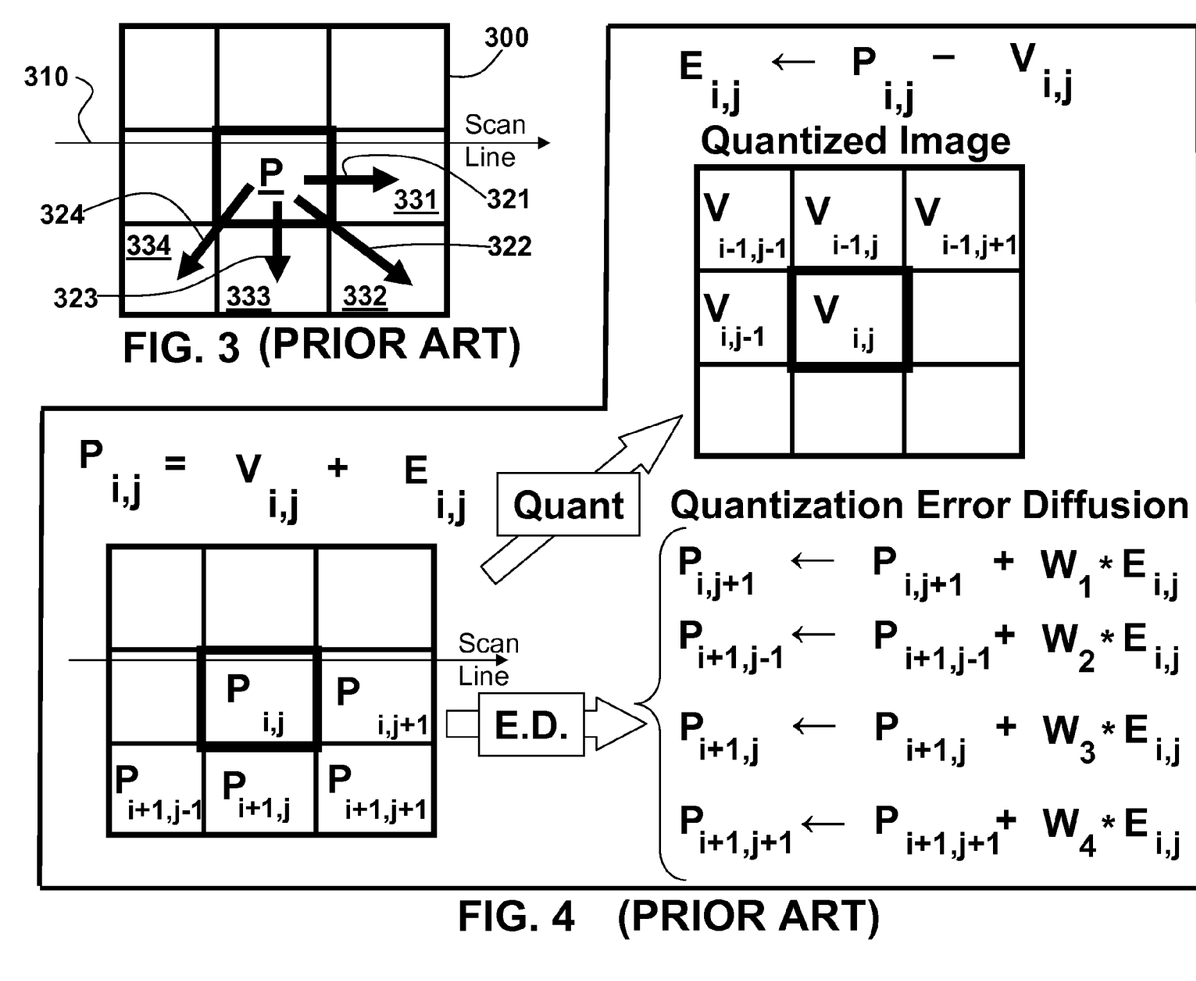
FIG. 3 illustrates apportioning tone quantization error to the tone levels of yet-to-be-quantized pixels.
FIG. 4 illustrates apportioning tone quantization error to the tone levels of yet-to-be-quantized pixels.

Image dithering may be used to distribute the resulting pixel tone quantization error. The results of image dithering may be used to adjust pixels of the quantized image for purposes of image display, e.g., intensity of tone levels for light display and density of pigmentation for print display. Methods, such as Floyd-Steinberg dithering, achieve image dithering by diffusing the quantization error of a pixel to the yet-unscanned neighboring pixels according to a weighted apportionment. The Floyd-Steinberg method typically quantizes the pixels of an image by scanning the image from left-to-right, top-to-bottom. FIG. 3 shows a portion of an image matrix 300, a three-by-three set of cells or pixels, and an example of a left-to-right scan 310 where the tone value of a pixel, P, is being quantized, and portions 321-324 of the resulting tone quantization error are distributed to the yet-unscanned, i.e., yet-to-be-quantized, nearest neighbor pixels 331-334 of the pixel, P. That is, each quantization cycle of a pixel in a left-to-right scan includes pushing portions of the quantization error to the neighboring pixel on the right and the three nearest neighbor pixels in the next scan line.

FIG. 4 shows a process where a pixel tone value may be defined by its row and column locations respectively as $P_{i,j}$, and conceptually may be comprised of a quantized tone value, $V_{i,j}$, and a tone error, $E_{i,j}$, where the tone error of this example is the difference between the original tone level and the quantized tone level. So conceptually, $P_{i,j} = V_{i,j} + E_{i,j}$. Based on a determined tone quantization threshold, $V_{i,j}$ can be established for $P_{i,j}$, as its representation in the quantized tone image. In turn, $E_{i,j}$ is established, i.e., $E_{i,j}$ is assigned the difference between $P_{i,j}$ and $V_{i,j}$, or $E_{i,j} \leftarrow (P_{i,j} - V_{i,j})$, and error diffusion (E.D.) may be effected by the value of $E_{i,j}$ being apportioned according to a weighting scheme to the yet-to-be-quantized nearest neighbors of $P_{i,j}$. Accordingly, the tone error diffusion of $P_{i,j}$ may be propagated as follows: (a) $P_{i,j+1} \leftarrow (P_{i,j+1} - w_1 * E_{i,j})$; (b) $P_{i+1,j-1} \leftarrow (P_{i+1,j-1} - w_2 * E_{i,j})$; (c) $P_{i+1,j} \leftarrow (P_{i+1,j} - w_3 * E_{i,j})$; and (d) $P_{i+1,j+1} \leftarrow (P_{i+1,j+1} - w_4 * E_{i,j})$. The Floyd-Steinberg method typically has the values of the weights normalized according to: $w_1 = 7/16$, $w_2 = 3/16$, $w_3 = 5/16$, and $w_4 = 1/16$.

If halftones are used to express the tone quantized image, the quantized tones for any pixel may be expressed via cells of a matrix, e.g., a two-by-two matrix, each cell having at least a monotone pigment level. The pigmentation of a cell is achieved via the application of a dot of pigment, the dot of pigment may bleed into the adjacent cells or may be insufficient to fully pigment a designated cell. By measuring dot intensity of various levels of pixel quantization, a gamma correction vector may be used to adjust the tone density of half-toned images.

SUMMARY

The present invention included method, system, and processor readable media, embodiments for tone quantization error diffusion. For example, a machine-enabled method of tone error diffusion in a pixel array may comprise steps of: (a) receiving a pixel array comprising a second line of pixels interposed between a first line of pixels and a third line of pixels; (b) a first stage process by a computing device comprising: (1) determining a tone error for a first pixel of the first line of pixels of the pixel array based on an input value of the first pixel of the first line of pixels and at least one threshold value, the first pixel having only one lineally adjacent pixel; (2) determining a tone error for a second pixel lineally adjacent to the first pixel of the first line of pixels based on: an input value of the second pixel of the first line of pixels, a portion of the tone error of the first pixel of the first line of pixels, and the at least one threshold value; (3) determining a tone error for a first pixel of the third line of pixels of the pixel array based on an input value of the first pixel of the third line of pixels and at least one threshold value, the first pixel of the third line of pixels having only one lineally adjacent pixel; and (4) determining a tone error for a second pixel lineally adjacent to the first pixel of the third line of pixels based on: an input value of the second pixel of the third line of pixels, a portion of the tone error of the first pixel of the third line of pixels, and the at least one threshold value; and (b) a second stage process by the computing device, or a second computing device in communication with the first computing device, comprising: (1) determining a tone error for a first pixel of the second line of pixels of the pixel array based on: an input value for the first pixel of the third line of pixels, a portion of the tone error of each adjacent pixel of the first line of pixels, a portion of the tone error of each adjacent pixel of the third line of pixels, and the at least one threshold value, the first pixel of the second line of pixels having only one lineally adjacent pixel; and (2) determining a tone error for a second pixel lineally adjacent to the first pixel of the second line of pixels based on: an input value for the second pixel of the third line of pixels, a portion of the tone error of the first pixel of the second line of pixels, a portion of the tone error of each adjacent pixel of the first line of pixels and a portion of the tone error of each adjacent pixel of the third line of pixels, and at least one threshold value.

The method may start on any line as a first line and continue with subsequent lines of the input pixels array. The method may be structured within a configured computing device, e.g., a processor having addressable memory and responsive to machine-readable instructions, to be performed iteratively until a stopping rule, such as the end of the input pixel array, is achieved. Accordingly, the first stage process of the method of tone error diffusion may further comprise: (a) iteratively determining a tone error for each successive pixel lineally adjacent to the second pixel of the first line of pixels based on an input value of the successive pixel of the first line of pixels, a portion of the determined tone error of the lineally adjacent pixel of the first line of pixels, and the at least one threshold value; and (b) iteratively determining a tone error for each successive pixel lineally adjacent to the second pixel of the third line of pixels based on an input value of the successive pixel of the third line of pixels, a portion of the determined tone error of the lineally adjacent pixel of the third line of pixels, and the at least one threshold value. Likewise, the second stage process may further comprise iteratively determining a tone error for each successive pixel lineally adjacent to the second pixel of the second line of pixels based on: an input value of the successive pixel of the second line of pixels, a portion of the determined tone error of the lineally adjacent pixel of the second line of pixels, a portion of the tone error of each adjacent pixel of the first line of pixels and a portion of the tone error of each adjacent pixel of the third line of pixels, and at least one threshold value.

The second stage process of the method of tone error diffusion embodiments of claim 1 may further have the step of determining a tone error for the second pixel lineally adjacent to the first pixel of the second line of pixels of the second stage process being based on: (a) an input value for the second pixel of the second line of pixels, (b) a portion of the tone error of the first pixel of the second line of pixels, (c) a portion of the tone error of each pixel of the first line of pixels within two pixel spaces from a pixel of the first line immediately adjacent to the second pixel of the second line, and a portion of the tone error of each pixel of the third line of pixels within two pixel spaces from a pixel of the third line immediately adjacent to the second pixel of the second line; and (d) at least one threshold value.

In addition, machine-enabled method embodiments of the present invention of diffusing tone quantization error of a digital image may comprise: (a) receiving, by a digital processor, a digital image having input pixel tone levels according to i rows and j columns; (b) for alternate rows of pixels of the digital image, the processor: (1) quantizing an assigned pixel tone level of each pixel, or $S_{i,j}$, in series j, wherein the assigned tone level, or $S_{i,j}$, comprises an input tone value, or $P_{i,j}$, and, if present, a partial tone quantization error, or $N_{i,j-1}$, from the last quantized pixel; and (2) determining a total quantization error, or $D_{i,j}$ comprising a partial tone quantization error, or $N_{i,j}$, and a remainder tone quantization error, or $E_{i,j}$, and (3) storing the remainder tone quantization error, or $E_{i,j}$; and (c) for rows of pixels interposed between the alternate rows of pixels of the digital image, the processor, or one or more additional processors in communication with the processor: (1) quantizing an assigned pixel tone level of each pixel, or $S_{i,j}$, in series j, of row i, where the assigned tone level, or $S_{i,j}$, comprises: (A) an input tone value, or $P_{i,j}$; (B) a partial tone quantization error, or $N_{i,j-1}$, from the last quantized pixel in row i, if present; and (C) a sum of a weighted remainder tone quantization errors of two or more of the nearest neighbor pixels of the alternate rows comprising the sum: $w_2*E_{i-1,j}+w_5*E_{i+1,j}+w_6*E_{i+1,j+1}$) and, at least one of: (i) the sum: $w_1*E_{i-1,j-1}+w_4*E_{i+1,j-1}$ and (ii) the sum: $w_3*E_{i-1,j+1}+w_6*E_{i+1,j-1}$ and (2) determining a total quantization error, or $D_{i,j}$ comprising a partial tone quantization error, $N_{i,j}$. The steps of quantizing the assigned pixel tone level of each pixel, or $S_{i,j}$, in series j for the method of diffusing tone quantization error of a digital image may based on a threshold value. For rows of pixels interposed between the alternate rows of pixels of the digital image, the quantizing step of the method of diffusing tone quantization error of a digital image may comprise quantizing an assigned pixel tone level of each pixel, or $S_{i,j}$, in series j, or row i, wherein the assigned tone level, or $S_{i,j}$, comprises: (A) an input tone value, or $P_{i,j}$; (B) a partial tone quantization error, or $N_{i,j-1}$, from the last quantized pixel in row i, if present; and (C) if remainder tone quantization errors $E_{i-1,j-1}, E_{i+1,j-1}, E_{i-1,j+1}$, and $E_{i+1,j+1}$ may be present, a sum of weighted remainder tone quantization errors of the nearest neighbor pixels of the alternate rows comprising: the sum: $w_1*E_{i-1,j-1}+w_2*E_{i-1,j}+w_3*E_{i-1,j+1}+w_4*E_{i+1,j-1}+w_5*E_{i+1,j}+w_6*E_{i+1,j+1}$. The weights of the method of diffusing tone quantization error of a digital image may sum to unity and may provide additional weight to the pixels immediately above and immediately below the pixel being quantized, i.e., sharing a common column, j. For example, the weights for the remainder tone error values may be assigned as follows: $w_1=\frac{1}{8}$; $w_2=\frac{2}{8}$; $w_3=\frac{1}{8}$; $w_4=\frac{1}{8}$; $w_5=\frac{2}{8}$; and $w_6=\frac{1}{8}$.

Embodiments of the present invention include machine-readable medium, particularly computer/processor readable medium having processor executable instructions thereon which, when executed by a processor cause the processor to: (a) for alternate rows of pixels of a digital image having input pixel tone levels according to i rows and j columns: (1) quantize an assigned pixel tone level of each pixel, or $S_{i,j}$, in series j, wherein the assigned tone level, or $S_{i,j}$, comprises an input tone value, or $P_{i,j}$, and, if present, a partial tone quantization error, or $N_{i,j-1}$, from a last quantized pixel; (2) determine a total quantization error, or $D_{i,j}$ comprising a partial tone quantization error, or $N_{i,j}$, and remainder tone quantization error, or $E_{i,j}$, and (3) store the remainder tone quantization error, or $E_{i,j}$; and (b) for rows of pixels interposed between the alternate rows of pixels of the digital image: (1) quantize an assigned pixel tone level of each pixel, or $S_{i,j}$, in series j, of row i, wherein the assigned tone level, or $S_{i,j}$, comprises: (A) an input tone value, or $P_{i,j}$; (B) a partial tone quantization error, or $N_{i,j-1}$, from the last quantized pixel in row i, if present; and (C) a sum of a weighted remainder tone quantization errors of two or more of the nearest neighbor pixels of the alternate rows comprising the sum : $(w_2*E_{i-1,j}+w_6*E_{i+1,j+1})$ and, at least one of: (i) the sum: $w_1*E_{i-1,j-1}+w_4*E_{i+1,j-1}$ and (ii) the sum: $w_3*E_{i-1,j+1}+w_6*E_{i+1,j+1}$; and (2) determine a total quantization error, or $D_{i,j}$, comprising a partial tone quantization error, $N_{i,j}$. The processor readable medium embodiments having processor executable instructions thereon, when executed by a processor, may additionally cause the processor to quantize the assigned pixel tone level of each pixel, or $S_{i,j}$, in series j based on a threshold value.

Embodiments of the present invention include machine-readable medium, particularly computer/processor readable medium having processor executable instructions thereon which, when executed by a processor cause the processor to: (a) for alternate rows of pixels of a digital image having input pixel tone levels according to i rows and j columns: (1) quantize an assigned pixel tone level of each pixel, or $S_{i,j}$, in series j, wherein the assigned tone level, or $S_{i,j}$, comprises an input tone value, or $P_{i,j}$, and, if present, a partial tone quantization error, or $N_{i,j-1}$, from a last quantized pixel; (2) determine a total quantization error, or $D_{i,j}$ comprising a partial tone quantization error, or $N_{i,j}$, and remainder tone quantization error, or $E_{i,j}$, and (3) store the remainder tone quantization error, or $E_{i,j}$; and (b) for rows of pixels interposed between the alternate rows of pixels of the digital image: (1) quantize an assigned pixel tone level of each pixel, or $S_{i,j}$, in series j, of row i, wherein the assigned tone level, or $S_{i,j}$, comprises: (A) an input tone value, or $P_{i,j}$; (B) a partial tone quantization error, or $N_{i,j-1}$, from the last quantized pixel in row i, if present; and (C) a sum of a weighted remainder tone quantization errors of two or more of the nearest neighbor pixels of the alternate rows comprising the sum: $w_2*E_{i-1,j}+w_5*E_{i+1,j}+w_6*E_{i+1,j+1}$) and, at least one of: (i) the sum: $w_1*E_{i-1,j-1}+w_4*E_{i+1,j-1}$ and (ii) the sum: $w_3*E_{i-1,j+1}+w_6*E_{i+1,j+1}$; and (2) determine a total quantization error, or $D_{i,j}$ comprising a partial tone quantization error, $N_{i,j}$. The processor readable medium embodiments having processor executable instructions thereon, when executed by a processor, may additionally cause the processor to quantize the assigned pixel tone level of each pixel, or $S_{i,j}$, in series j based on a threshold value.

BRIEF DESCRIPTION OF THE DRAWINGS

Embodiments of the present invention are illustrated by way of example and not limitation in the figures of the accompanying drawings, and in which.

DETAILED DESCRIPTION

Figures 5, 6B:
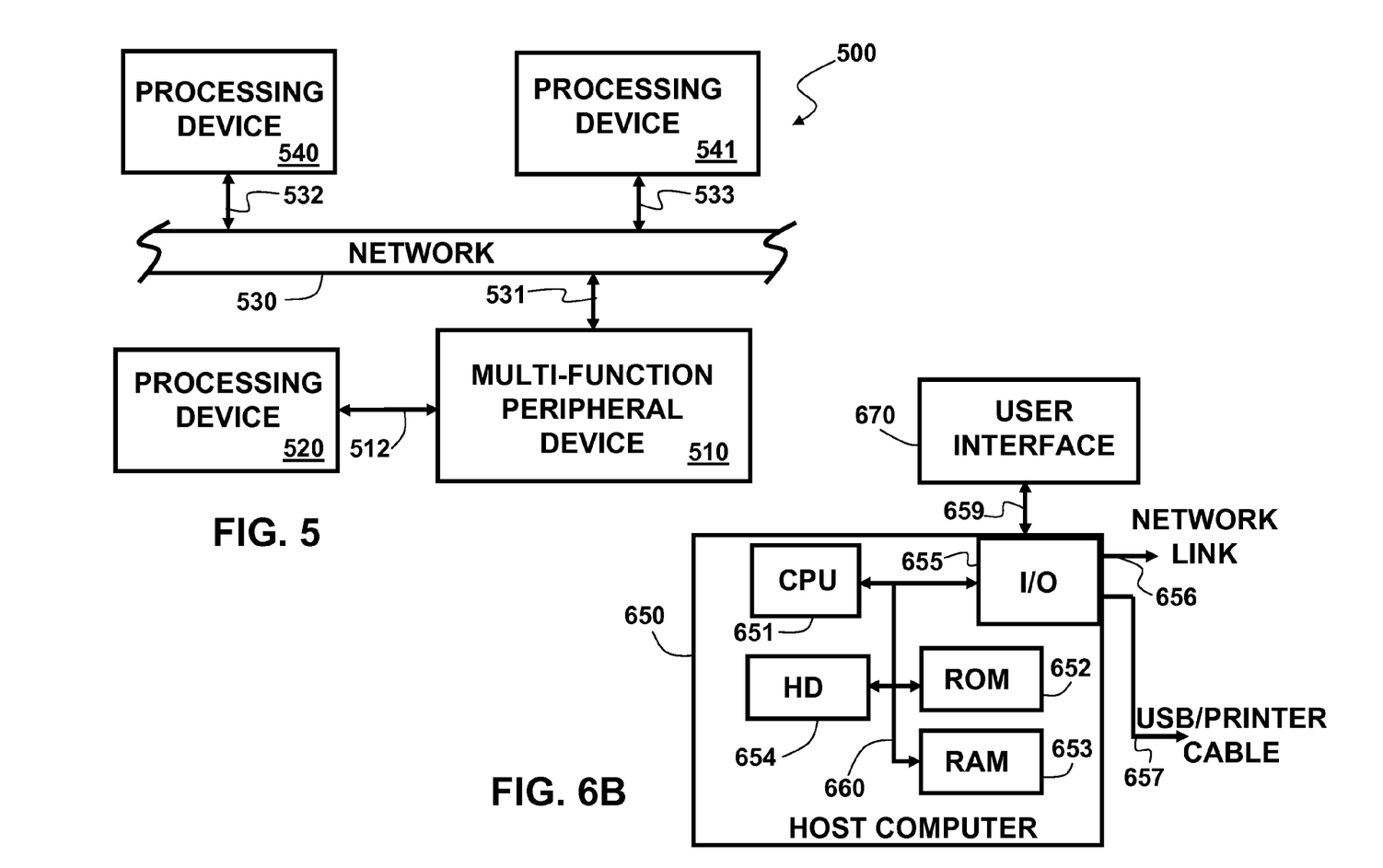
FIG. 5 illustrates, at a top level an exemplary system comprising a plurality of processing devices in communication with a multi-function peripheral (MFP) device.
FIG. 6B illustrates a top level functional block diagram of an exemplary host computer that may host a driver embodiment of the present invention.

FIG. 5 illustrates an exemplary system embodiment 500 of the present invention where a printing device or a multi-functional peripheral (MFP) device 510 may be in direct communication 512 with a processing device 520, such as a computer hosting one or more drivers applicable to the printing device or multi-functional peripheral device 510. In addition, via a network 530 and a network link 531 - 533, the printing device or a multi-functional peripheral device 510 may be in communication with one or more processing devices 540, 541, such as a one or more computers that may each host one or more drivers applicable to the printing device or the MFP device 510.

Figure 6A:
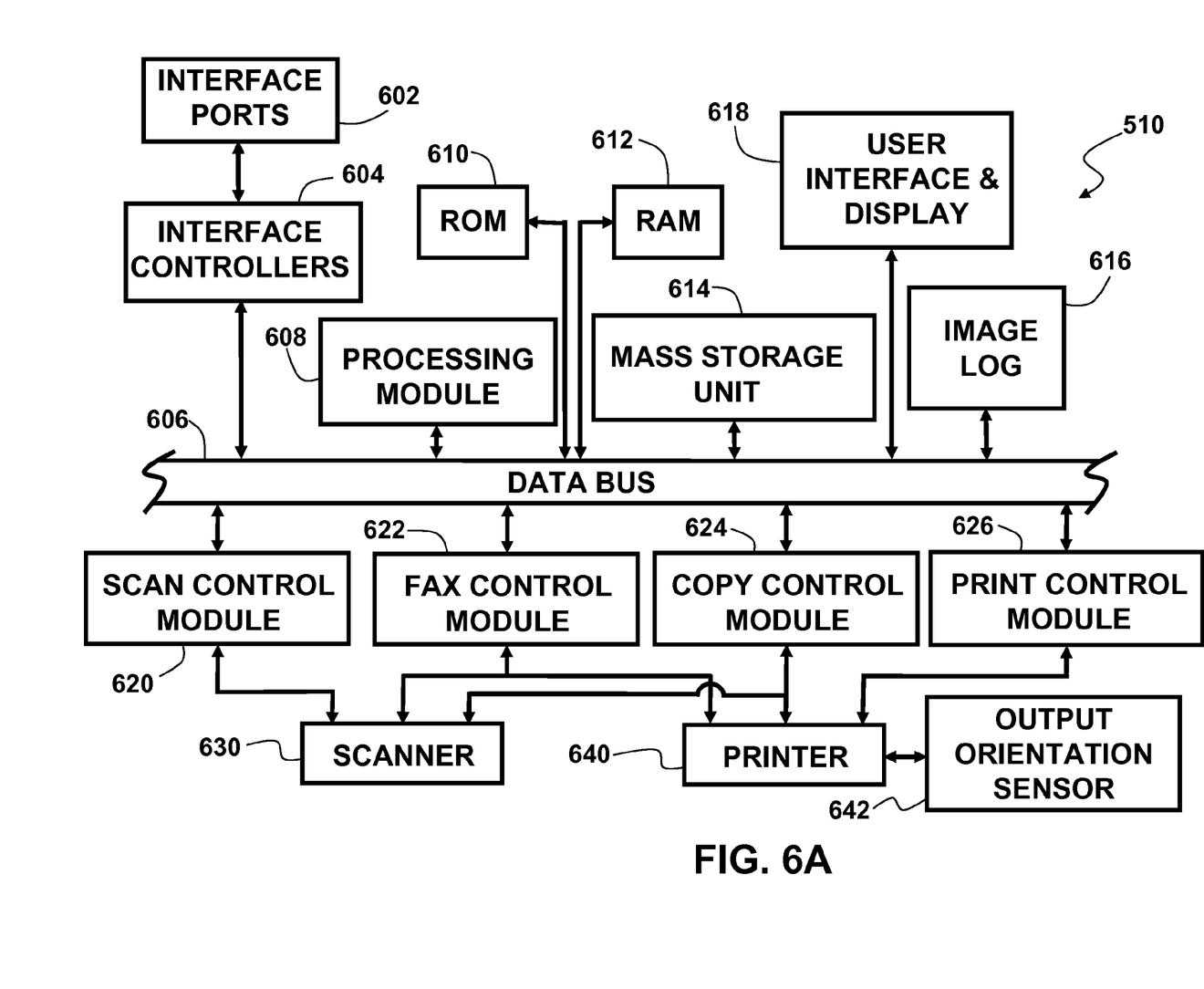
FIG. 6A illustrates a top level functional block diagram of an exemplary MFP device.

The exemplary printing device or MFP device 510 of FIG. 5 may be illustrated in greater exemplary functional detail in FIG. 6A. Interface ports 602 may be present to connect a printer cable, a network link, or an external wireless module. The interface ports 602 may be serviced by one or more interface controllers 604 that function to direct communications and/or condition signals between the respective interface port 602 and one or more modules of the MFP device 510 which may be in common communication via a data bus 606. The MFP device 510 may include one or more processing modules 608 that may draw data from read only memory (ROM) 610 and exchange data with random access memory (RAM) 612 and may store files having sizes greater than the RAM 612 capacity in one or more mass storage units 614. The MFP device 510 may maintain a log of its images 616 and have a user display and interface 618. The image log 616 may be a separate module or distributed, for example, with a portion executed via the processing module 608 that may access parameters, files, and/or indices that may be stored in ROM 610, RAM 612, a mass storage unit 614 or in combination thereof. The MFP device 510 may include as individual or separate modules a scan control module 620, a facsimile (FAX) control module 622, and a copy control module 624 where each module may service the scanner 630 to direct communications and/or condition signals between the scanner 630 and one or more modules of the MFP device 510, for example, via the data bus 606. The MFP device 510 may include as individual or separate modules the FAX control module 622, the copy control module 624 and a print control module 626 where each module may service the printer 640 to direct communications and/or condition signals between the printer 640 and the one or more modules of the MFP device 510, for example, via the data bus 606. The exemplary MFP device 510 may store a calibration table in ROM 610, RAM 612, a mass storage unit 614 or in combination thereof and accordingly, the calibration table may be accessed by the print control module 626 and/or a processing module 608 and made available to devices external to the MFP device 510 via one or more interface ports 602. The exemplary MFP device 510 may have notice, for example, due to a user input via the user interface 618 or sensed by an output orientation sensor 642 of the printer 640 and may be communicated via the print control module 626 to devices external to the MFP device 510 via one or more interface ports 602. FIG. 6B illustrates a top level functional block diagram of a processing device that is an exemplary host computer 650 that may host a driver embodiment of the present invention that, via an input/output interface 655 may interface 659 with the exemplary MFP of FIG. 6A via a wireless or wired network link 656 or a parallel, serial, or universal serial bus (USB) cable 657. The user interface 670 may include tactile input via keyboard, mouse and/or touch screen and/or audio input via a microphone. The user interface 670 may provide output to the user via a display, e.g. a graphical user interface (GUI), and/or provide audio output to the user via one or more speakers, headphones or ear buds. The host computer 650 may further comprise a central processing unit (CPU) 651, read only memory (ROM) 652, random access memory (RAM) 653 and a mass storage unit 654, such as a hard disk drive (HD). Two or more elements of the host computer 650 may be in communication via a data bus 660. The general accessing of data, processing of data and communication and display of data may be handled at the CPU level of the host computer 650 by an operating system such as MICROSOFT™ WINDOWS™.

Viewing FIGS. 5, 6A, and 6B together, image tone quantization may be performed by a computer 540, 541, 520, 650, for display purposes, and, for printing purposes, by a computer 540, 541, 520, 650 in communication 530, 656, 657 with an MFP 510, by the MFP 510, or via a combination of steps distributed between two or more processing units that may include the MFP 510. The resulting images may have a quantized tone level per pixel that may be based on a determined or predetermined threshold setting. For a printing example, two-by-two monotone cells may be used as a halftone cell to express five levels of tone. An image region comprises several cells to achieve a resolution such as 300 dpi or 600 dpi. While the ideal tone intensities of one, two, and three pigmented cells may be expected to be 25%, 50%, and 75% respectively, due to pigmentation mechanics, measured tone intensities may be much different, e.g., 60%, 80%, and 92% respectively. Eight-bit expressions of tone levels may equate these measured exemplary results to "153," "204," and "235" respectively, where "255" would be 100%—the highest intensity level.

Figure 7:
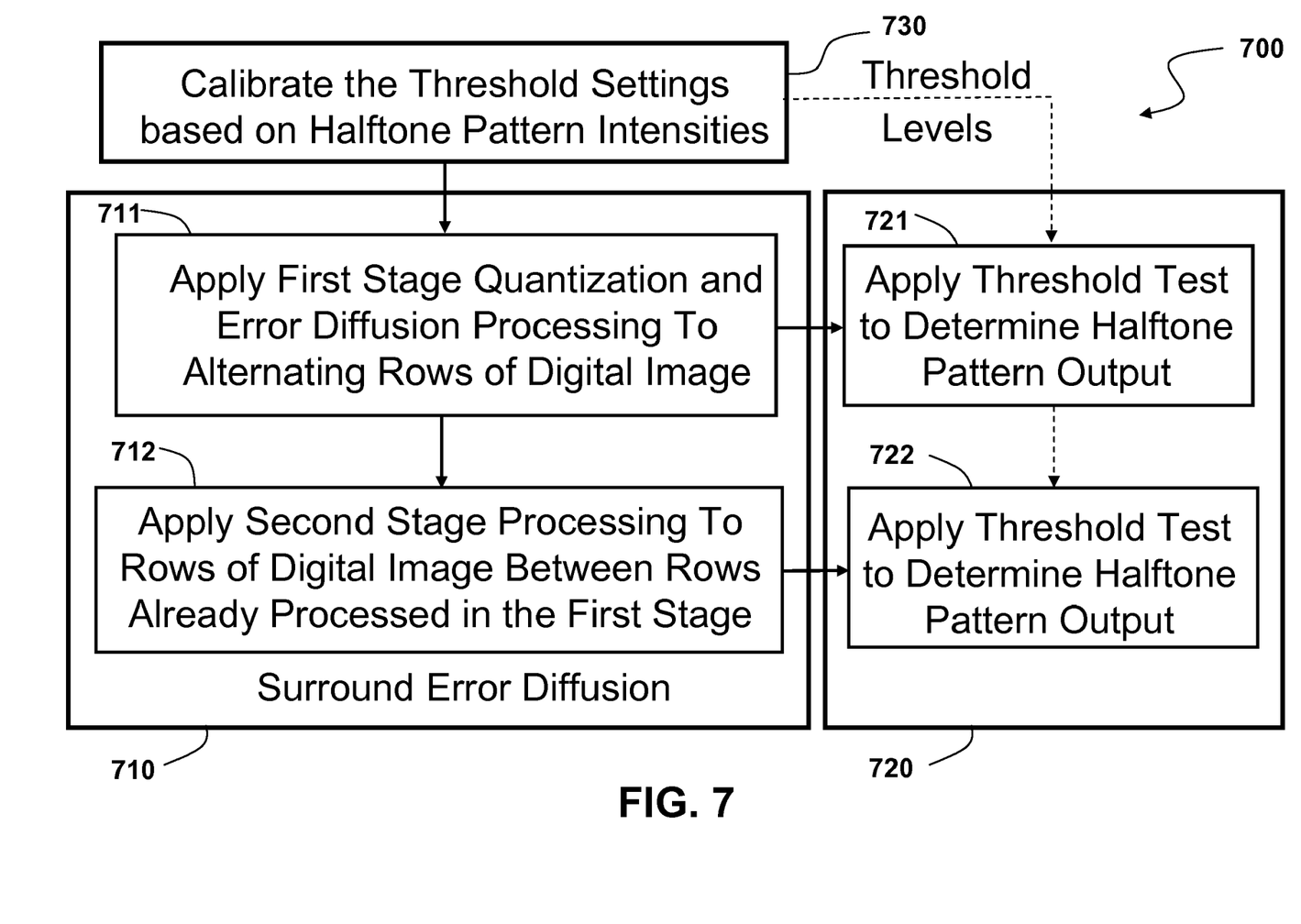
FIG. 7 is a top-level flow chart of a process embodiment of the present invention.

FIG. 7 is a top-level process block diagram 700 of an embodiment of the present invention. The surround error diffusion process 710 is shown comprising a first stage process 711 and a second stage process 712. Also shown is a testing process 720 by which quantized pixels may be expressed according to halftones. Once the quantization and error diffusion are completed for lines scanned according to the first stage 711, the quantized pixels may be tested 721 to determine their actual output halftone pattern. Once the quantization and error diffusion are completed for lines scanned according to the second stage 712, the quantized pixels may be tested 722 to determine their actual output halftone pattern. Before the testing, threshold levels for an exemplary five-level halftone output are determined 730 by measuring dot intensities for the output device, e.g., the MFP, at the three intermediate tone levels.

Figure 8:
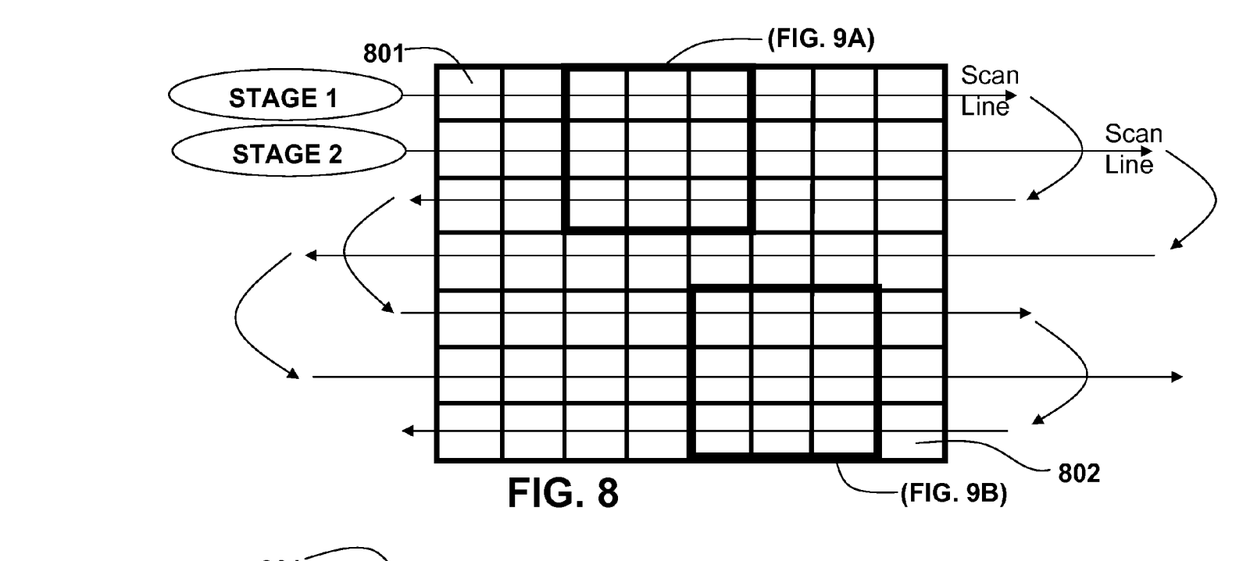
FIG. 8 illustrates exemplary scan patterns of the first stage and second stage processing of the present invention.
Figure 9A:
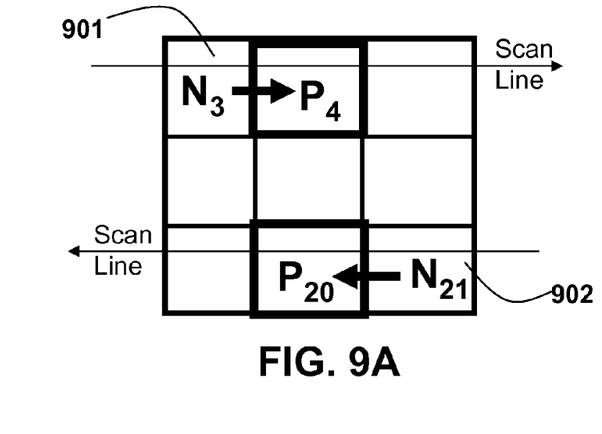
FIG. 9A illustrates an example of the apportionment of tone quantization error to the tone levels of yet-to-be quantized pixels during the first stage processing.
Figure 9B:
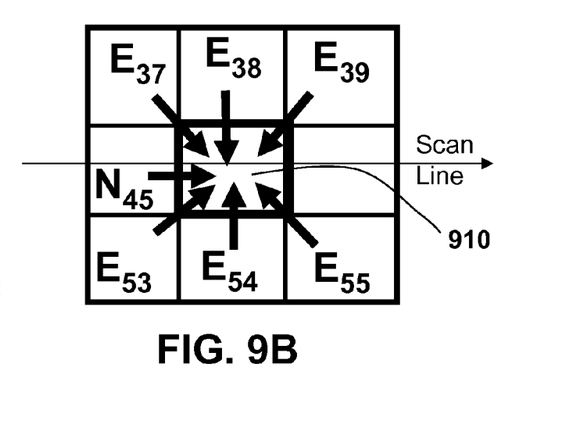
FIG. 9B illustrates an example of the apportionment of tone quantization error to the tone levels of yet-to-be quantized pixels during the second stage processing.

FIG. 8 illustrates an exemplary scanning pattern of the present invention. An exemplary horizontal scanning pattern, i.e., the order and direction of serial tone quantization, of the first stage processing may be every other row of pixels of an image, or every other column according to a vertical scanning pattern. The scanning direction may be right-to-left, left-to-right, or alternate between the two directions, as shown in FIG. 8. Accordingly, every other row may be skipped, i.e., not quantized, during the first stage processing. An exemplary horizontal pattern of the second stage processing is along the rows interposed between the rows scanned during the first stage of processing. The direction of scanning may be right-to-left, left-to-right, or alternate between the two directions, as shown in FIG. 8. For purposes of illustration, the pixels of the matrix of FIG. 8 are referenced serially, left-to-right, starting with the first pixel 801 that may be referenced also as pixel location no. 1 in this example, and the last pixel 802 that may be referenced also as pixel location no. 56 in this example. A portion of FIG. 8 is shown in FIG. 9A where the top or first row is scanned left-to-right. The pixel tone value of a pixel 901 has been quantized, leaving a quantization tone error, a portion of which, $N_3$, may be added to the pixel tone value of the next pixel, $P_4$, prior to quantization. The second row of FIG. 9A is shown as skipped, for now, and the third row of FIG. 9A is shown to be scanned in an opposite direction from the first row, in this example, where the pixel tone value of the quantized pixel 902 results in a quantization tone error, a portion of which, $N_{21}$, may be added to the pixel tone value of the next pixel, $P_{20}$, prior to its tone value quantization. Portions of the tone quantization error of the pixels of the first and third rows, and tone error not already allocated to the pre-quantized adjacent pixel in the row may be saved for allocation to the rows to be scanned during the second stage of processing. For example, the total tone error associated with the first pixel 901 may be $N_3 + E_3$. A portion of FIG. 8 is shown in FIG. 9B where the second or middle row (of FIG. 9B) is scanned left-to-right. Prior to the tone quantization of the center pixel (of FIG. 9B), the tone error, $N_{45}$, of the previously quantized pixel in the middle row and portions of the saved tone quantization error from the nearest neighbors of the pixels scanned during the first stage of processing, i.e., portions of $E_{37}$ to $E_{39}$ and $E_{53}$ to $E_{55}$, are added to the yet unquantized tone value of pixel 910.

Figure 10:
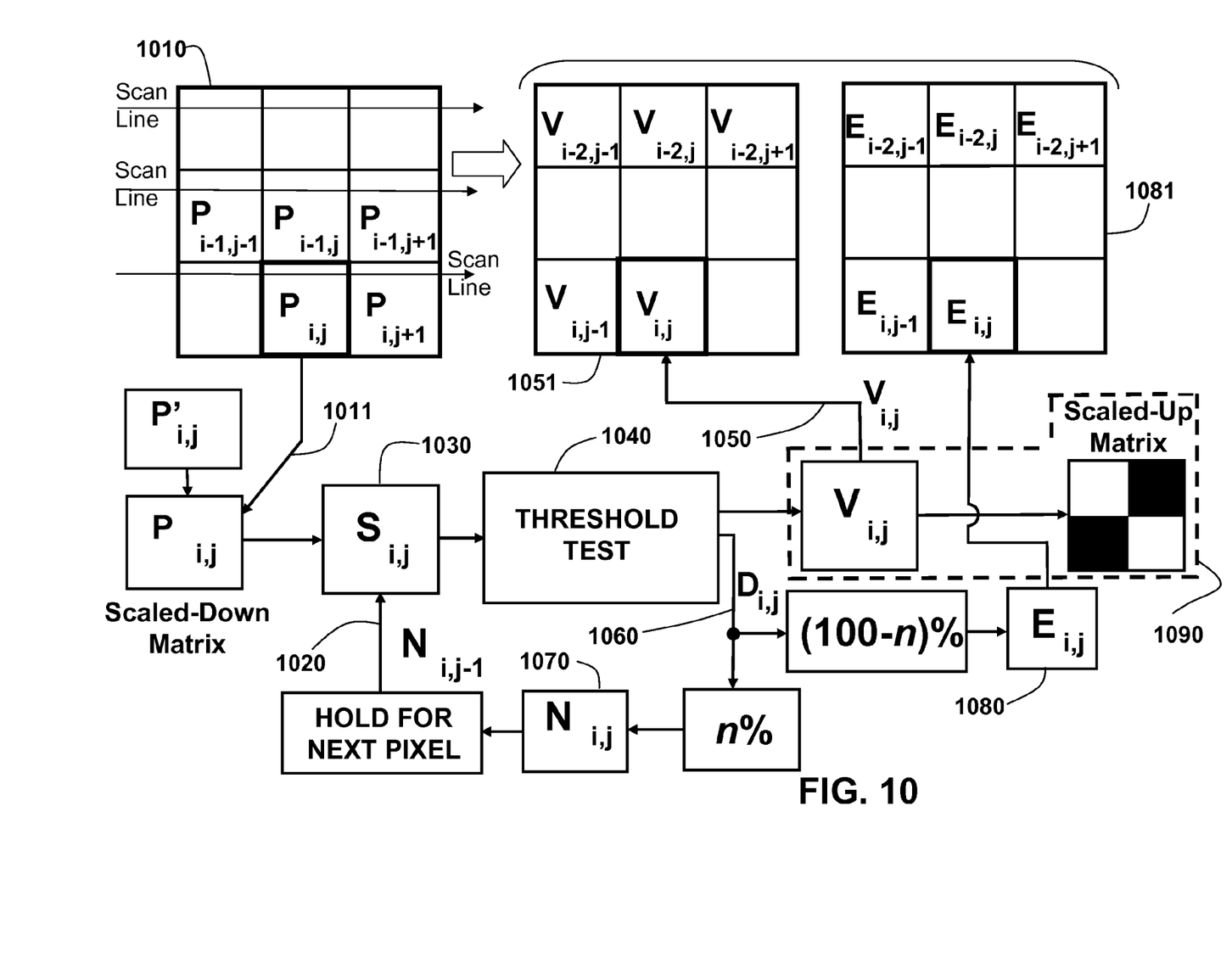
FIG. 10 illustrates an example of the apportionment of tone quantization error to the tone levels of yet-to-be quantized pixels during the first stage processing.

FIG. 10 illustrates the first stage process in more detail where a pixel having a tone value either not yet quantized or undergoing quantization is shown by the variable P with subscript indicating a row and column location respectively. Accordingly, $P_{i,j}$ 1011 is the tone value of a pixel undergoing quantization in the $i^{th}$ row and $j^{th}$ column of the digital image 1010. To facilitate faster processing by reducing total pixels, the digital image may be a scaled-down version of an original digital image, i.e., the image comprising $P_{i,j}$ may be a lower resolution of an image comprising more than one pixel, e.g., $P'_{i,j}$, in place of $P_{i,j}$. A portion of the tone error 1020, $N_{i,j-1}$, from the previously quantized pixel in the exemplary left-to-right scan line is added to the pixel tone value, $P_{i,j}$, to generate a summed value 1030, $S_{i,j}$. This summed valued, e.g., an assigned value of: $S_{i,j} \leftarrow (P_{i,j} + N_{i,j-1})$, may be compared 1040 with one or more threshold values for tone quantization to generate a quantized tone value 1050, $V_{i,j}$. The quantized image 1051, at its base, then may be comprised of an array of quantized tone values, $V_{i,j}$. The quantized tone values, $V_{i,j}$, may provide a basis for a process 1090 of half-toning and expanding the resolution of the quantized image. For example, by being within one of the ranges available for half-toning, a calibrated halftone value will be assigned to the pixel as its quantized tone value, $V_{i,j}$. The difference between the quantized tone value 1050, $V_{i,j}$, value and the assigned or summed value 1030, $S_{i,j}$, may be treated as the total tone error 1060, $D_{i,j}$, i.e., $D_{i,j} \leftarrow (S_{i,j} - V_{i,j})$. A portion, e.g., n %, of the total tone error 1060, $D_{i,j}$, may be assigned as a tone value addition 1070, $N_{i,j}$, for the next pixel in the scan line, i.e., $N_{i,j} \leftarrow (n\% * D_{i,j})$. An exemplary embodiment of the first stage processing may have the value of n=50, and so $N_{i,j} \leftarrow 50\% * (S_{i,j} - V_{i,j}) = (S_{i,j} - V_{i,j})/2$. In addition, the remainder of the total error 1080, $E_{i,j}$, i.e., the portion not assigned for the next pixel, e.g., (100−n)%, may be saved to a buffer 1081 or memory location corresponding to the presently quantized pixel. For example, $E_{i,j} \leftarrow ((100-n)\% * D_{i,j})$ or $E_{i,j} \leftarrow (D_{i,j} - N_{i,j})$. Reference is made the Appendix section below providing exemplary pseudocode of an embodiment of the present invention.

Figure 11:
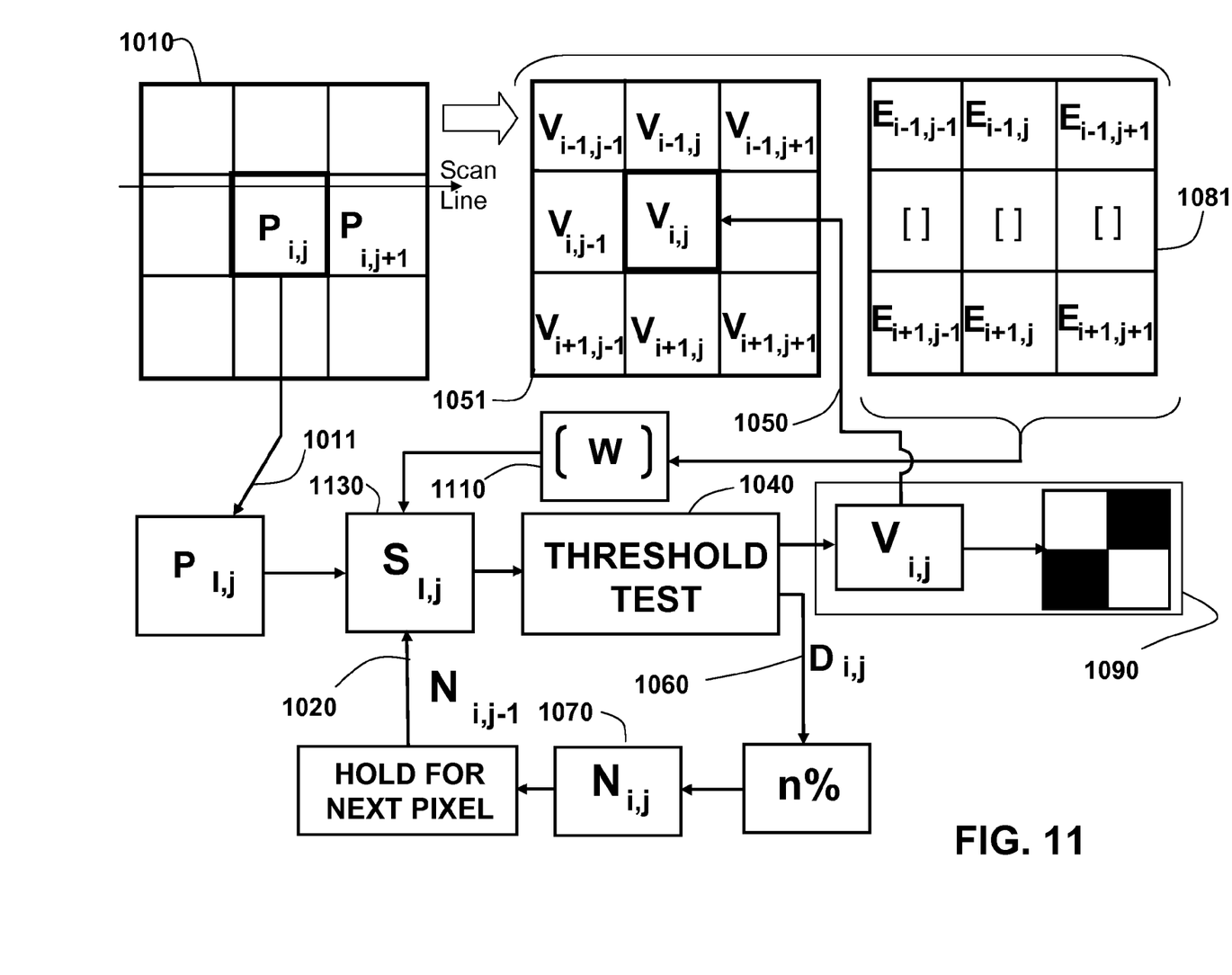
FIG. 11 illustrates an example of the apportionment of tone quantization error to the tone levels of yet-to-be quantized pixels during the second stage processing.

FIG. 11 illustrates the second stage process in more detail where a pixel having a tone value either not yet quantized or undergoing quantization is shown by the variable P with subscript indicating a row and column location respectively. Accordingly, $P_{i,j}$ 1011 is the tone value of a pixel undergoing quantization in the $i^{th}$ row and $j^{th}$ column of the digital image. A portion of the tone error 1020, $N_{i,j-1}$, from the previously quantized pixel in the exemplary left-to-right scan line is added to the pixel tone value, $P_{i,j}$, and weighted portions 1110 of the error buffer entries from the nearest neighbors of the rows scanned as part of the first stage, are also added to the pixel tone value 1011, $P_{i,j}$, to generate an assigned or summed value 1130, $S_{i,j}$. Weighting values 1110 may be used to combine remainder of the total error of the row above and row below from the buffer 1081, and the sum of the six weights, e.g., $w_1$ to $w_6$, may sum to unity. The assigned or summed valued, e.g., $S_{i,j} \leftarrow (P_{i,j} + N_{i,j-1} + w_1*E_{i-1,j-1} + w_2*E_{i-1,j} + w_3*E_{i-1,j+1} + w_4*E_{i+1,j-1} + w_5*E_{i+1,j} + w_6*E_{i+1,j+1})$, may be compared with one or more threshold values for purposes of tone quantization. Exemplary values of the weights may be at least one tone error portion from each of the three closest quantized pixels of the immediately adjacent rows and a doubling of that portion for the quantized pixel immediately above and immediately below the pixel being quantized according to the second stage process. So, examples of the weights may be: $w_1=\frac{1}{8}$; $w_2=\frac{2}{8}$; $w_3=\frac{1}{8}$; $w_4=\frac{1}{8}$; $w_5=\frac{2}{8}$; and $w_6=\frac{1}{8}$. By being within one of the ranges available for half-toning, the calibrated halftone value will be assigned to the pixel as its quantized tone value 1050, $V_{i,j}$, and the difference between the quantized tone value 1050, $V_{i,j}$, and the assigned or summed value, may be treated as the total tone error 1060, $D_{i,j}$, i.e. $D_{i,j} \leftarrow (S_{i,j} - V_{i,j})$. A portion, e.g., n %, of the total tone error may be assigned as an tone value addition for the next pixel in the scan line, i.e., $N_{i,j} \leftarrow ((n\%/100)*D_{i,j})$.

Figure 12:
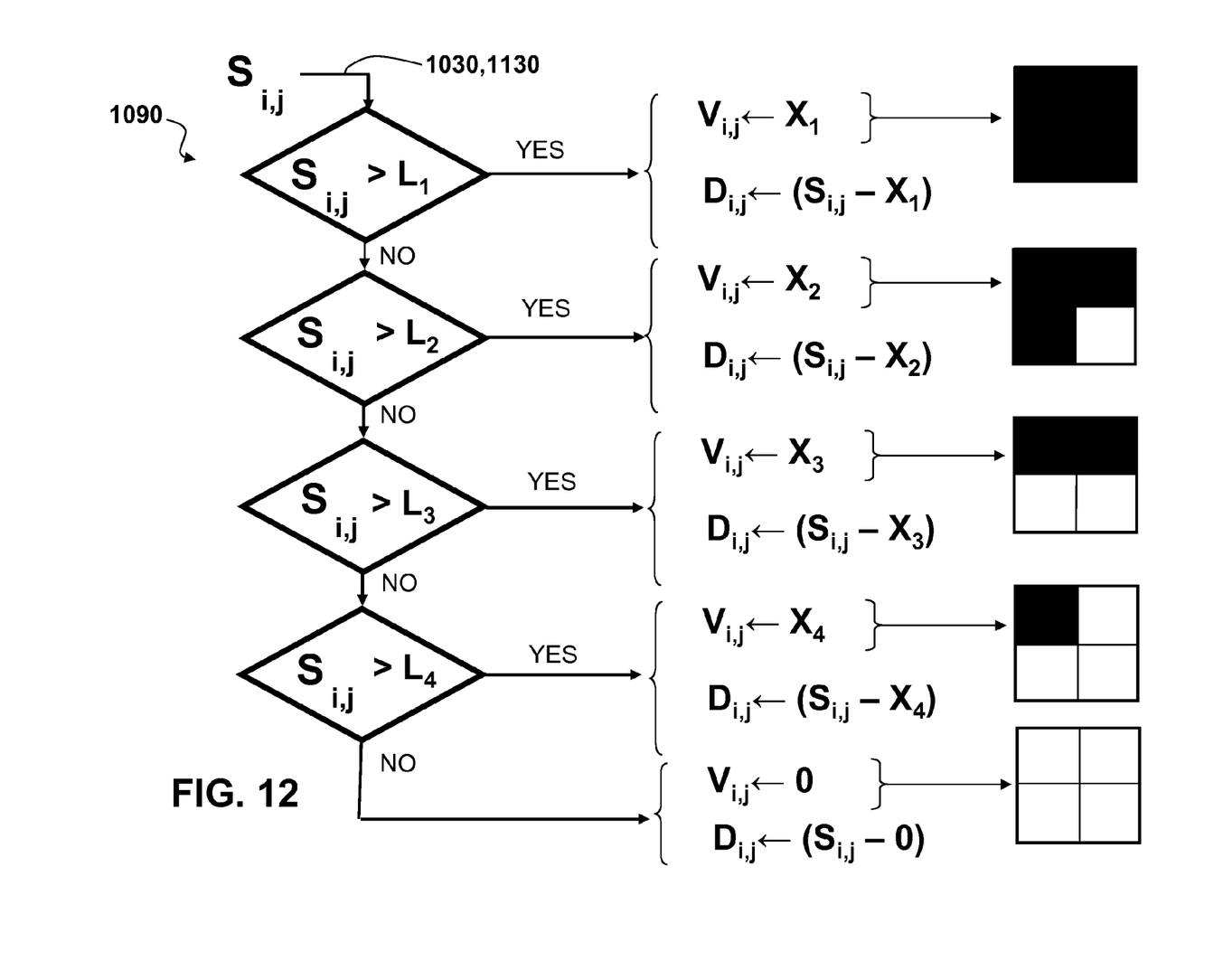
FIG. 12 illustrates an example of the thresholding for quantizing and half-toning the tone levels of the pixels.

FIG. 12 illustrates a process 1090 of half-toning and expanding the resolution of the quantized image in an exemplary arrangement of threshold tests for a five-level halftoning. For each pixel, prior to quantization, the assigned or summed value 1030, 1130, $S_{i,j}$, may be tested against successively decreasing tone level threshold values, e.g., $L_1$ to $L_4$. For example, a summed value, $S_{i,j}$, may be close to 100% intensity. Its quantized value, $V_{i,j}$, may be assigned the value corresponding to 100% intensity, e.g., $X_1$. The total quantization tone error, for this assignment, $D_{i,j}$, may then be apportioned according to the surround error diffusion process. A numerical example may be illustrated where 100% intensity may be expressed according to the 8-bit integer scale as 255. If $S_{i,j} > (L_1 = 248)$, then the pixel would be quantized to a value of 255, i.e., $V_{i,j} \leftarrow X_1 = 255$. If $(L_1 = 248) > S_{i,j} > (L_2 = 236)$, then the pixel would be quantized to a value of 242, i.e., $V_{i,j} \leftarrow X_2 = 242$. If $(L_2 = 236) > S_{i,j} > (L_3 = 150)$, then the pixel would be quantized to a value of 230, i.e., $V_{i,j} \leftarrow X_3 = 230$. If $(L_3 = 150) > S_{i,j} > (L_4 = 56)$, then the pixel would be quantized to a value of 112, i.e., $V_{i,j} \leftarrow X_4 = 112$. If $S_{i,j} < (L_4 = 56)$, then the pixel would be quantized to a value of 0, i.e., $V_{i,j} \leftarrow 0$. The value of n may be assigned accordingly: if n=50%, then 50%, or one-half, of the tone error is apportioned to the next pixel to be quantized then: $N_{i,j} \leftarrow (S_{i,j} - V_{i,j})/2$ or $N_{i,j} \leftarrow (D_{i,j})/2$, and then $E_{i,j} \leftarrow D_{i,j} - N_{i,j}$.

One of ordinary skill in the art will appreciate that the elements, modules, and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments may be combined with or substituted for one another in order to form varying modes of the disclosed invention. Thus, it is intended that the scope of the present invention herein disclosed should not be limited by the particular disclosed embodiments described above.

APPENDIX

The following comprises pseudocode of an exemplary embodiment of the present invention, where the text of line, separated by and following the "%" symbol is included as explanatory comment:

```
% Surround Error Diffusion
%
% Copyright 2009 Sharp Labs of America
% Tone curve adjusted from 95/90/50 to 95/90/37.6
% Output gray-levels ranging from 0 to 15, where 15 is the highest density
% for a 4-bit scale, equivalent to the highest density of the 8-bit
  scale, i.e., 255.
% pp is calibrated actual density:
% output 1 pixel: pp=112, 2: pp=230, 3: pp=242, 4 pixels: pp=255
im=imread(filename_in);
[M,N,P]=size(im);
% out=zeros(M,N,'uint16');
eout=zeros(M*2,N*2,4,'uint8');
er=zeros(M,N,4,'int16');        % error buffer
ww=[0 0 0 0];
xx=[0 0 0 0];
yy=[0 0 0 0];
zz=[0 0 0 0];
cc=0;
% count row numbers
if (mod(M,2)>0)
    m2=M/2;
    m1=m2+1;
else
    m1=M/2;
    m2=m1-1;
    cc=1;
end
% first time
for (i=1:m1)
    kk=i*2-1;
    nn=[0 0 0 0];
    for (j=1:N)
        cmyk = double(reshape(im(kk,j,:),[1,4]));
        for (k=1:4)
            x=cmyk(k);
            x=x+nn(k);
            if(x>248)
                ww(k)=15; xx(k)=15; yy(k)=15; zz(k)=15; pp=255; %100
            elseif(x>236)
                ww(k)=15; xx(k)=15; yy(k)=15; zz(k)=0; pp=242; %95
            elseif(x>150)
                ww(k)=15; xx(k)=15; yy(k)=0; zz(k)=0; pp=230; %90
            elseif(x>56)
                ww(k)=15; xx(k)=0; yy(k)=0; zz(k)=0; pp=112; %37.6
            else
                ww(k)=0; xx(k)=0; yy(k)=0; zz(k)=0; pp=0;
            end
            nn(k)=(x-pp)/2;
            er(kk,j,k)=nn(k);
        end
        eout(kk*2-1,j*2-1,:)=reshape(ww,[1,1,4]);
```

-continued

```
      eout(kk*2−1,j*2,:)=reshape(xx,[1,1,4]);
      eout(kk*2,j*2−1,:)=reshape(yy,[1,1,4]);
      eout(kk*2,j*2,:)=reshape(zz,[1,1,4]);
    end
  end
  % second time
  for (i=1:m2)
      kk=i*2;
      cmyk = double(reshape(im(kk,1,:),[1,4]));
      % j=1 //code skipped
      % j=2~N−1
      for (j=2:(N−1))
        cmyk = double(reshape(im(kk,j,:),[1,4]));
        for (k=1:4)
          x=cmyk(k);
          x=x+er(kk,j−1,k)+double(er(kk−1,j−1,k)+2*er(kk−1,j,k)+
er(kk−1,j+1,k)+er(kk+1,j−1,k)+2*er(kk+1,j,k)+er(kk+1,j+1,k))/8;
          if(x>248)
            ww(k)=15; xx(k)=15; yy(k)=15; zz(k)=15; pp=255; %100
          elseif(x>236)
            ww(k)=15; xx(k)=15; yy(k)=15; zz(k)=0; pp=242; %95
          elseif(x>150)
            ww(k)=15; xx(k)=15; yy(k)=0; zz(k)=0; pp=230; %90
          elseif(x>56)
            ww(k)=15; xx(k)=0; yy(k)=0; zz(k)=0; pp=112; %37.6
          else
            ww(k)=0; xx(k)=0; yy(k)=0; zz(k)=0; pp=0;
          end
          mm=(x−pp)/2;
          er(kk,j,k)=mm;
          er(kk+1,j,k)=er(kk+1,j,k)+mm;
        end
        eout(kk*2−1,j*2−1,:)=reshape(ww,[1,1,4]);
        eout(kk*2−1,j*2,:)=reshape(xx,[1,1,4]);
        eout(kk*2,j*2−1,:)=reshape(yy,[1,1,4]);
        eout(kk*2,j*2,:)=reshape(zz,[1,1,4]);
      end
      cmyk = double(reshape(im(kk,N,:),[1,4]));
      % j=N //code skipped
  % last scanline // code skipped
```

What is claimed is:

1. A method of tone error diffusion in a pixel array comprising:
  receiving a pixel array comprising a second line of pixels interposed between a first line of pixels and a third line of pixels;
  a first stage process comprising:
    determining a tone error for a first pixel of the first line of pixels of the pixel array based on an input value of the first pixel of the first line of pixels of the first stage process and at least one threshold value, the first pixel having only one lineally adjacent pixel;
    determining a tone error for a second pixel lineally adjacent to the first pixel of the first line of pixels based on: an input value of the second pixel of the first line of pixels of the first stage process, a portion of the tone error of the first pixel of the first line of pixels, and the at least one threshold value;
    determining a tone error for a first pixel of the third line of pixels of the pixel array based on an input value of the first pixel of the third line of pixels of the first stage process and the at least one threshold value, the first pixel of the third line of pixels having only one lineally adjacent pixel; and
    determining a tone error for a second pixel lineally adjacent to the first pixel of the third line of pixels based on: an input value of the second pixel of the third line of pixels of the first stage process, a portion of the tone error of the first pixel of the third line of pixels and the at least one threshold value; and
  a second stage process comprising:
    determining a tone error for a first pixel of the second line of pixels of the pixel array based on: an input value for the first pixel of the third line of pixels of the second stage process, a portion of the tone error of each adjacent pixel of the first line of pixels, a portion of the tone error of each adjacent pixel of the third line of pixels, and the at least one threshold value, the first pixel of the second line of pixels having only one lineally adjacent pixel; and
    determining a tone error for a second pixel lineally adjacent to the first pixel of the second line of pixels based on: an input value for the second pixel of the third line of pixels of the second stage process, a portion of the tone error of the first pixel of the second line of pixels, a portion of the tone error of each adjacent pixel of the first line of pixels and a portion of the tone error of each adjacent pixel of the third line of pixels, and the at least one threshold value.

2. The method of tone error diffusion of claim 1 wherein the first stage process further comprises:
  iteratively determining a tone error for each successive pixel lineally adjacent to the second pixel of the first line of pixels based on an input value of the successive pixel of the first line of pixels of the first stage process, a portion of the determined tone error of the lineally adjacent pixel of the first line of pixels, and the at least one threshold value;
  iteratively determining a tone error for each successive pixel lineally adjacent to the second pixel of the third line of pixels based on an input value of the successive pixel of the third line of pixels of the first stage process, a portion of the determined tone error of the lineally adjacent pixel of the third line of pixels, and the at least one threshold value; and
  wherein the second stage process further comprises:
    iteratively determining a tone error for each successive pixel lineally adjacent to the second pixel of the second line of pixels based on: an input value of the successive pixel of the second line of pixels of the second stage process, a portion of the determined tone error of the lineally adjacent pixel of the second line of pixels, a portion of the tone error of each adjacent pixel of the first line of pixels and a portion of the tone error of each adjacent pixel of the third line of pixels, and at least one threshold value.

3. The method of tone error diffusion of claim 1 wherein the step of determining a tone error for the second pixel lineally adjacent to the first pixel of the second line of pixels of the second stage process is based on: an input value for the second pixel of the second line of pixels of the second stage process, a portion of the tone error of the first pixel of the second line of pixels, a portion of the tone error of each pixel of the first line of pixels within two pixel spaces from a pixel of the first line immediately adjacent to the second pixel of the second line, and a portion of the tone error of each pixel of the third line of pixels within two pixel spaces from a pixel of the third line immediately adjacent to the second pixel of the second line, and at least one threshold value.

4. A method of diffusing tone quantization error of a digital image comprising:
  receiving a digital image having input pixel tone levels according to i rows and j columns;
  for alternate rows of pixels of the digital image:
    quantizing an assigned pixel tone level of each pixel, or $S_{i,j}$, in series j, wherein the assigned tone level, or $S_{i,j}$, comprises an input tone value, or $P_{i,j}$, and, a partial tone quantization error, or $N_{i,j-1}$, from the last quantized pixel in row i, if present; and determining a total quantization error, or $D_{i,j}$ comprising a partial tone quantization error, or $N_{i,j}$, and a remainder tone quantization error, or $E_{i,j}$, and storing the remainder tone quantization error, or $E_{i,j}$; and for rows of pixels interposed between the alternate rows of pixels of the digital image:

quantizing an assigned pixel tone level of each pixel, or $S_{i,j}$, in series j, of row i, wherein the assigned tone level, or $S_{i,j}$, comprises: (a) an input tone value, or $P_{i,j}$; (b) a partial tone quantization error, or $N_{i,j-1}$, from the last quantized pixel in row i, if present; and (c) a sum of a weighted remainder tone quantization errors of two or more of the nearest neighbor pixels of the alternate rows comprising the sum: $(w_2*E_{i-1,j}+w_5*E_{i+1,j}+w_6*E_{i+1,j+1})$ and, at least one of: (i) the sum: $w_1*E_{i-1,j-1}+w_4*E_{i+1,j-1}$ and (ii) the sum: $w_3*E_{i-1,j+1}+w_6*E_{i+1,j+1}$; and determining a total quantization error, or $D_{i,j}$ comprising a partial tone quantization error, $N_{i,j}$.

5. The method of diffusing tone quantization error of a digital image of claim 4 wherein the steps of quantizing the assigned pixel tone level of each pixel, or $S_{i,j}$, in series j is based on a threshold value.

6. The method of diffusing tone quantization error of a digital image of claim 4 wherein for rows of pixels interposed between the alternate rows of pixels of the digital image, the quantizing step comprises:

quantizing an assigned pixel tone level of each pixel, or $S_{i,j}$, in series j, of row i, wherein the assigned tone level, or $S_{i,j}$, comprises: (a) an input tone value, or $P_{i,j}$; (b) a partial tone quantization error, or $N_{i,j-1}$, from the last quantized pixel in row i, if present; and (c) if remainder tone quantization errors $E_{i-1,j-1}$, $E_{i+1,j-1}$, $E_{i-1,j+1}$, and $E_{i+1,j+1}$ are present, a sum of weighted remainder tone quantization errors of the nearest neighbor pixels of the alternate rows comprising: the sum: $w_1*E_{i-1,j-1}+w_2*E_{i-1,j}+w_3*E_{i-1,j+1}+w_4*E_{i+1,j-1}+w_5*E_{i+1,j}+w_6*E_{i+1,j+1}$.

7. The method of diffusing tone quantization error of a digital image of claim 6 wherein $w_1=1/8$; $w_2=2/8$; $w_3=1/8$; $w_4=1/8$; $w_5=2/8$; and $w_6=1/8$.

8. A system for producing image output comprising: an image tone quantization module, the image tone quantization module comprising a processor having addressable memory, wherein the processor is configured to:

input a digital image having input pixel tone levels according to i rows and j columns; and for alternate rows of pixels of the input digital image:

quantize an assigned pixel tone level of each pixel, or $S_{i,j}$, in series j, of row i, wherein the assigned tone level, or $S_{i,j}$, comprises an input tone value, or $P_{i,j}$, and, if present, a partial tone quantization error, or $N_{i,j-1}$, from a last quantized pixel; and determine a total quantization error, or $D_{i,j}$ comprising a partial tone quantization error, or $N_{i,j}$, and remainder tone quantization error, or $E_{i,j}$, and store the remainder tone quantization error, or $E_{i,j}$; and for rows of pixels interposed between the alternate rows of pixels of the input digital image:

quantize an assigned pixel tone level of each pixel, or $S_{i,j}$, in series j, of row i wherein the assigned tone level, or $S_{i,j}$, comprises: (a) an input tone value, or $P_{i,j}$; (b) a partial tone quantization error, or $N_{i,j-1}$, from the last quantized pixel in row i, if present; and (c) a sum of a weighted remainder tone quantization errors of two or more of the nearest neighbor pixels of the alternate rows comprising the sum: $w_2*E_{i-1,j-1}+w_5*E_{i+1,j}+w_6*E_{i+1,j-1}$) and, at least one of: (i) the sum: $w_1*E_{i-1,j-1}+w_4*E_{i+1,j-1}$ and (ii) the sum: $w_3*E_{i-1,j+1}+w_6*E_{i+1,j+1}$; and determine a total quantization error, or $D_{i,j}$ comprising a partial tone quantization error, $N_{i,j}$.

9. The image tone quantization module of the system for producing image output of claim 8 wherein the image tone quantization module is further configured to quantize the assigned pixel tone level of each pixel, or $S_{i,j}$, in series j based on a threshold value.

10. A processor readable non-transitory medium having processor executable instructions thereon which, when executed by a processor cause the processor to:

for alternate rows of pixels of a digital image having input pixel tone levels according to i rows and j columns:

quantize an assigned pixel tone level of each pixel, or $S_{i,j}$, in series j, wherein the assigned tone level, or $S_{i,j}$, comprises an input tone value, or $P_{i,j}$, and, if present, a partial tone quantization error, or $N_{i,j-1}$,from a last quantized pixel; and determine a total quantization error, or $D_{i,j}$ comprising a partial tone quantization error, or $N_{i,j}$, and remainder tone quantization error, or $E_{i,j}$, and store the remainder tone quantization error, or $E_{i,j}$; and for rows of pixels interposed between the alternate rows of pixels of the digital image:

quantize an assigned pixel tone level of each pixel, or $S_{i,j}$, in series j, of row i, wherein the assigned tone level, or $S_{i,j}$, comprises: (a) an input tone value, or $P_{i,j}$; (b) a partial tone quantization error, or $N_{i,j-}$, from the last quantized pixel in row i, if present;

and (c) a sum of a weighted remainder tone quantization errors of two or more of the nearest neighbor pixels of the alternate rows comprising the sum: $(w_2*E_{i-1,j}+w_5*E_{i+1,j}+w_6*E_{i+1,j-1})$ and, at least one of: (i) the sum: $w_1*E_{i-1,j-1}+w_4*E_{i+1,j-1}$ and (ii) the sum: $w_3*E_{i-1,j+1}+w_6*E_{i+1,j+1}$; and determine a total quantization error, or $D_{i,j}$ comprising a partial tone quantization error, $N_{i,j}$.

11. The processor readable non-transitory medium having processor executable instructions thereon of claim 10 which, when executed by a processor cause the processor to quantize the assigned pixel tone level of each pixel, or $S_{i,j}$, in series j based on a threshold value.

* * * * *